(12) United States Patent
Kraemer et al.

(10) Patent No.: US 10,970,780 B2
(45) Date of Patent: *Apr. 6, 2021

(54) ZERO-KNOWLEDGE PREDICTIONS MARKET

(71) Applicant: International Business Machines Corporation, Armonk, NY (US)

(72) Inventors: James R. Kraemer, Santa Fe, NM (US); Jeb R. Linton, Herndon, VA (US)

(73) Assignee: International Business Machines Corporation, Armonk, NY (US)

(*) Notice: Subject to any disclaimer, the term of this patent is extended or adjusted under 35 U.S.C. 154(b) by 290 days.

This patent is subject to a terminal disclaimer.

(21) Appl. No.: 15/340,045

(22) Filed: Nov. 1, 2016

(65) Prior Publication Data

US 2018/0122006 A1    May 3, 2018

(51) Int. Cl.
*G06Q 40/04* (2012.01)
*H04L 29/06* (2006.01)
*H04L 9/32* (2006.01)

(52) U.S. Cl.
CPC .......... *G06Q 40/04* (2013.01); *H04L 9/3218* (2013.01); *H04L 63/0407* (2013.01);
(Continued)

(58) Field of Classification Search
CPC ............ G06Q 20/065; G06Q 20/3829; G06Q 2220/00; G06Q 40/04; H04L 9/0637; H04L 63/06; H04L 2209/56

See application file for complete search history.

(56) References Cited

U.S. PATENT DOCUMENTS

2004/0176994 A1\* 9/2004 Fine .................. G06Q 10/06
705/35
2008/0133417 A1\* 6/2008 Robinson ........... G06Q 30/0282
705/52

(Continued)

OTHER PUBLICATIONS

Wayne W. LaMorte, MD, PhD, MP, "The Role of Probability: Basic Concepts of Probability", Jun. 24, 2016, Boston University School of Public Health, http://sphweb.bumc.bu.edu/otlt/MPH-Modules/BS/BS704_Probability/BS704_Probability3.html (Year: 2016).\*

(Continued)

*Primary Examiner* — Jay Huang
*Assistant Examiner* — Courtney P Jones
(74) *Attorney, Agent, or Firm* — Fleit Intellectual Property Law; Jon Gibbons (57) ABSTRACT

A service running on a server includes a method running on a server, for example as a cloud server. The method begins with receiving from a user using a zero-knowledge protocol, each of a unique token associated with the user, an identifier of a statement to be rated, a vote related to the statement; and a pledged quantity tied to a reputation of the user and the vote. The vote either supports or opposes a veracity of the statement. Next, a confirmation is made to ensure that the unique token is associated with the user. A difference is determined between the pledge quantity and a numerical rating of the reputation of the user. In response to confirming the unique token is associated with the user and the difference is non-negative, updating a rating of the statement using zero-knowledge verifiable computing.

20 Claims, 6 Drawing Sheets

(52) U.S. Cl.
CPC .......... *H04L 63/06* (2013.01); *H04L 63/0807* (2013.01); *H04L 63/0823* (2013.01); *G06Q 2220/00* (2013.01); *H04L 2209/38* (2013.01); *H04L 2209/56* (2013.01)

(56) References Cited

U.S. PATENT DOCUMENTS

| | | | | |
|---|---|---|---|---|
| 2011/0251992 | A1* | 10/2011 | Bethlehem | H04L 67/306 |
| | | | | 707/610 |
| 2012/0167189 | A1* | 6/2012 | Aichroth | H04L 9/006 |
| | | | | 726/7 |
| 2016/0027229 | A1* | 1/2016 | Spanos | G07C 13/00 |
| | | | | 705/51 |
| 2016/0275294 | A1* | 9/2016 | Irvine | G06Q 20/02 |
| 2017/0091750 | A1* | 3/2017 | Maim | H04L 9/30 |
| 2017/0149796 | A1* | 5/2017 | Gvili | H04L 9/085 |
| 2017/0358161 | A1* | 12/2017 | Hao | G07C 13/02 |
| 2018/0077122 | A1* | 3/2018 | Hoss | H04L 63/0407 |
| 2018/0083780 | A1* | 3/2018 | Alesiani | H04L 9/3218 |

OTHER PUBLICATIONS

Berman, J., "Zero-Check: A Zero-Knowledge Protocol for Reconciling Patient Identities Across Institutions", Archives of Pathology & Laboratory Medicine, Mar. 2004, pp. 1-3, vol. 128.
SCIPR, "Overview", http://www.scipr-lab.org/, last visited on Jun. 15, 2016, p. 1.
U.S. Appl. No. 14/752,230, filed Jun. 26, 2015.
U.S. Appl. No. 14/858,389, filed Sep. 18, 2015.
U.S. Appl. No. 14/970,966, filed Dec. 16, 2015.
U.S. Appl. No. 15/082,509, filed Mar. 28, 2016.
U.S. Appl. No. 15/079,203, filed Mar. 24, 2016.
U.S. Appl. No. 15/290,142, filed Oct. 11, 2016.
U.S. Appl. No. 15/258,297, filed Sep. 7, 2016.
U.S. Appl. No. 15/209,834, filed Jul. 14, 2016.
U.S. Appl. No. 15/407,345, filed Jan. 17, 2017.

* cited by examiner

ZERO-KNOWLEDGE PREDICTIONS MARKET

BACKGROUND

The present invention generally relates to services, and more particularly for exchange-traded markets created for the purposes of trading the outcome of events while maintaining privacy of users.

Prediction markets are exchange-traded markets created for the purpose of trading outcomes of events. Market prices in prediction markets indicate what participants believe the probability of an event. Events may be business issues, current events, financial topics and more. These prediction markets are difficult to implement with robust protection from fraud and previously impossible to implement without specific knowledge of unique or demonstrably rare information on contributors to the system. Current prediction markets are maintained by providers, such as, Intrade.com, Betfair.com, and iPredict.com, often depend on the ability to link personal information, such as names, and addresses to prevent abuse.

SUMMARY

One embodiment of trading outcomes of events is a computer-implemented method. The method includes receiving, from a user using a zero-knowledge protocol to maintain privacy of the user, a unique token associated with the user, an identifier of a statement to be rated, a vote related to the statement; and a pledged quantity tied to a reputation of the user and the vote. The vote either supports or opposes a veracity of the statement. Further, there may not be a one-to-one match of the vote that supports the veracity of the statement being given equal weight as the vote that opposes the veracity of the truth.

Next, a confirmation is made to check that the unique token is associated with the user. A comparison of the pledge quantity to the reputation rating is made.

The method includes receiving, using a zero-knowledge protocol, a rating with a unique token anonymously associated with a user, and identifier of a party to be rated. The party in one example is a person or a business entity. The unique token in one example is one or more of a tax identifier, an e-passport, or a private key of a DNS Domain registered with a certificate authority.

A few examples of zero-knowledge verifiable computing include but are not limited to: a succinct computational integrity and privacy (SCIP) technique; a zero-knowledge succinct non-interactive argument of knowledge (zk-snark) technique; or a probabilistically checkable proof (PCP) technique. The proof can be whether the program is using at least one of trusted computing, secure boot attestation, or a combination or derivative technique thereof.

Other embodiments of the invention include a system and a computer program product.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention is presented for purposes of illustration and description, but is not intended to be exhaustive or limited to the invention in the form(s) disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

An embodiment of the present invention is provided as part of a cloud service which associates a prediction of an outcome of an event in an exchange-traded market with a pledged quantity from a user to the prediction. The pledged quantity can be a currency, such as crypto currency or tied to the reputation of the user making the prediction.

In one embodiment, the cloud services may take the form of native cryptocurrency smart contracts in which staked currency is held on a blockchain until the resolution time of the proposition, at which time the currency is disbursed automatically through the functioning of the blockchain-based network. In this case the verifiable computation provides the added value of supporting more complex transactions than the blockchain may support natively, without losing the ability to guarantee transaction integrity between untrusting or anonymous parties.

Alternately, the service may not use cryptocurrency-based smart contracts or to use them only in part, but instead provide privacy and integrity simply using zero-knowledge verifiable computing. This allows pledging a number of "reputons" (units of reputation of a user) in addition to or as an alternative to cryptocurrency, without loss of the ability to operate in zero-knowledge with a guarantee of integrity and privacy.

The present invention functions across many services and providers. In some embodiments, the service operates with zero-knowledge verifiable computing in order to improve confidence of anonymity among all participating parties. It can provide a reasonable basis for trusted transactions between unknown parties.

One or more embodiments of the present invention provide an anonymous service which can reliably collect and maintain a rating management system of the veracity of a statement and individuals that use and provide feedback on them. Existing fact checking and rating management systems may rely on service providers that collect sensitive personal information on individuals and on providers of goods and services.

The present invention enables people and organizations to stake an arbitrary portion of their online reputations or currency on a prediction of an outcome of an event in an exchange-traded market. Parties with an interest in invalidating such statement can attempt to counter it by voting against or opposing the prediction. This enables participants to either support or to counter such predictions.

Participants in the system connect to an exchange traded market management system or instance and, optionally, submit one or more pledged quantities on the prediction of the outcome of an event. A participant can assert that the prediction is true and stake a selected number of "reputons" on the truth of it. In one embodiment, the service queries an exchange-traded market management system to verify that the user has that number of positive reputons at the time of the transactions, and if so, records the pledged quantity and the number of reputons or pledge quantity staked on it. This is then placed in a pledge database. The pledge may be shared with other participants as part of the exchange traded market management system. Other participants may then stake additional reputons or crypto currency on that statement, or may attempt to negate the Assertion by accumulation of "bogons", by staking reputons to declare that a prediction is bogus or unlikely.

This system defines and ties a unique set of quantified, normalized reputation characteristics or pledge quantities of currency to individuals participating in the system by establishing an independent decentralized but robustly attested body of knowledge that could be used as input to transactions between parties.

By tying reputations to an individual's e-passport identifier, a corporation's business tax ID or the private key of a DNS Domain registered with a certificate authority, or any similarly unique token to the participant's behavior as recorded through anonymous feedback from other system participants, the system motivates individual participants to "behave well" as judged by the overall community of participants, without compromising the individual's privacy or revealing information that could be used to identify any individual participant.

The overall prediction algorithm for the exchange-traded markets may be as simple as a tally of unitary "up votes" and "down votes" with the pledged quantity by the overall community or more complex algorithms making use of weighting factors such as seniority and reputation within a closed sub-community, the number of users of a service provided by a corporate body such as a commercial enterprise, or any number of other factors. Some embodiments depend on the zero-knowledge method of gathering and maintaining an individual's or a corporate body's reputation score.

Provability/Verifiability: A preferred embodiment of the invention provides as a set of services advertised in a distributed peer to peer network of cloud services, each of which would be verifiable as valid and untampered—using Probabilistically Checkable Proofs (PCPs), Zero-Knowledge Succinct Non-Interactive Arguments of Knowledge (ZK-SNARKs), Succinct Computational Integrity and Privacy (SCIP), or similar methods of verified computational integrity.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "down vote" or "bogon" means a vote against or that opposes the veracity of a statement, proposition or assertion.

The phrase "identifier of a prediction" means a pointer or link to a prediction. The pointer is usually pointing to a statement stored in a file or database.

The phrase "outcome of an event" means a probability that the event is happening. The probability can be between 0 and 100%.

The phrase "prediction for an outcome of an event" means a vote or probability that supports or opposes that a given event will happen within a stated time period.

The term "rating" or "ranking" means a ranking of a person or business entity, such as a company, LLC, PA, etc., based on a comparative assessment of their quality, standard, or performance.

The term "reputation unit" means a ranking of a person or business entity, such as a company, LLC, PA, etc., based on a comparative assessment of their quality, standard, or performance.

The term "unique token" means digital certificate signed by a trusted certificate authority, such as epassport, tax identifier, or private key of DNS domain registered with a certificate authority, in which the signature can be validated without revealing which user associated to the epassport.

The term "up vote" or "reputon" means a vote that supports the veracity of a statement, proposition or assertion.

The phrase "verifiable computing" in cryptography, is a method by which one party, the prover (also referred to herein as a "user"), can prove to another party, the verifier that a program has been or is being executed correctly and without modification or tampering.

The term "vote" means a vote that supports or opposes the veracity of a statement, proposition or assertion.

A "zero-knowledge protocol", in cryptography, is a method by which one party, the prover, (also referred to herein as a "user", can prove to another party, the verifier (also referred to herein as a "service provider") providing a service that a given statement is true, without conveying any information apart from the fact that the statement is indeed true.

The phrase "zero-knowledge verifiable computing" is a method of verifiable computing whereby a program is specially compiled to perform a function and produce a result while simultaneously computing and providing a cryptographic proof that it executed correctly in untampered-with form. The computed proof can be probabilistically checked to verify the integrity of the computation, to varying levels of assurance depending on how many bits of the proof the checker chooses to verify. This method is known in the art as a Probabilistically Checkable Proof (PCP) and may take several forms, including interactive proof during the execution of the program and non-interactive proof at the completion of the program execution. The phrase "zero-knowledge verifiable computing" is a method of verifiable computing which can also provide the proof of integrity through a zero-knowledge protocol. This combination of Verifiable Computing with a Zero-Knowledge protocol, often also using a succinct method such as Succinct Computational Integrity and Privacy (SCIP) and zero-knowledge Succinct Non-Interactive Arguments of Knowledge (zkSNARK) techniques, combines the advantages of verifiability, succinctness, and zero-knowledge operation maximizing assurance of both integrity and privacy while minimizing computational cost.

Using Indirection to Create a Unique Identifier

Figure 1:
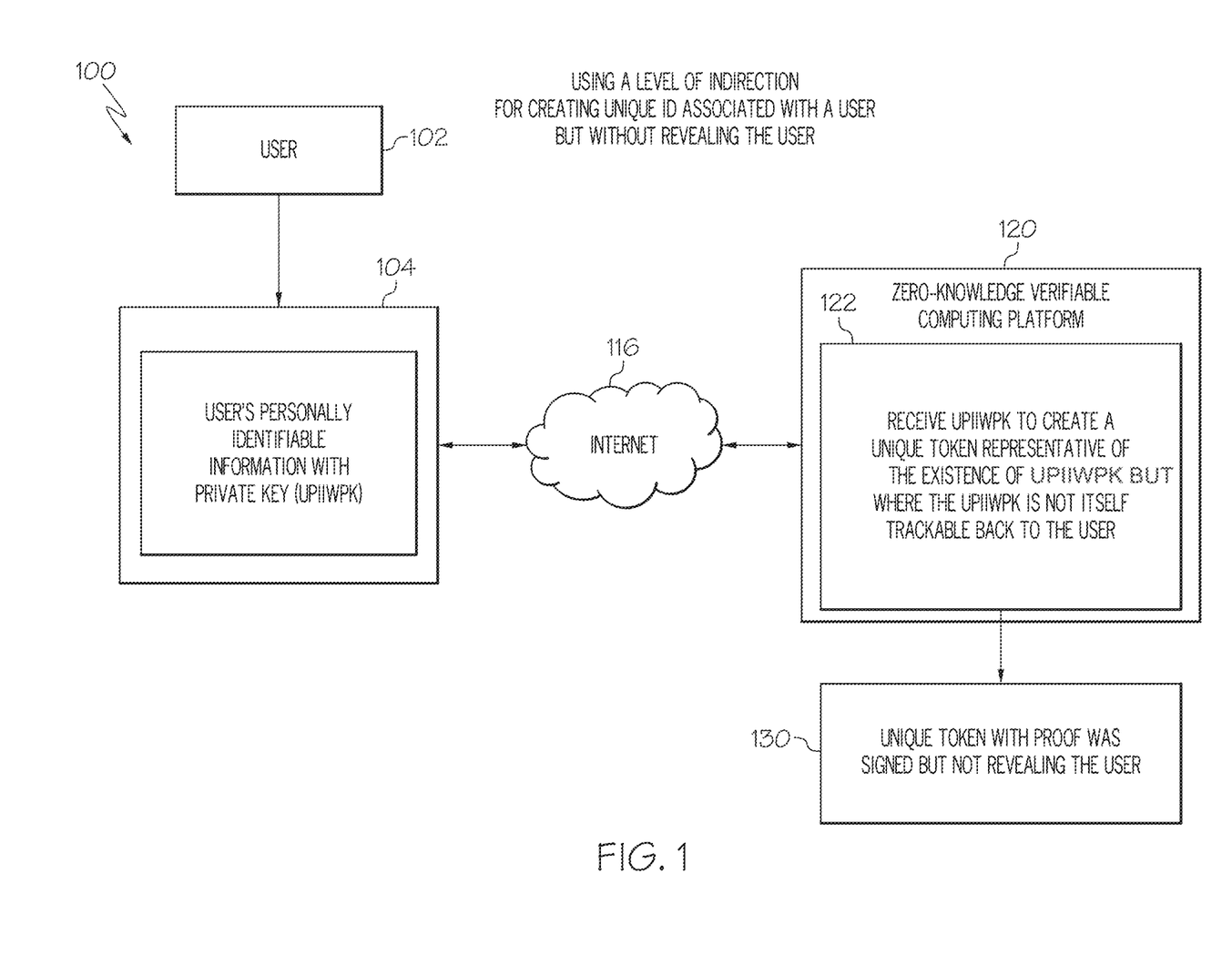
FIG. 1 is a functional diagram illustrating one example of using indirection to create a unique token for a specific user without revealing which user is associated with the token, in accordance with an embodiment of the present invention.

FIG. 1 is a functional diagram 100 illustrating one example of using indirection to create a unique token for a specific user without revealing which user is associated with the token, in accordance with an embodiment of the present invention. As depicted, a user 102, makes available the user's personally identifiable information with a private key ("UPIIWPK") 104. By way of example and without limitation, examples of uniquely identifiable information include: an epassport, a tax id, or a private key of DNS domain registered with a certificate authority. An epassport is also known as a biometric passport. It looks like a traditional passport book, but it contains an electronic chip that is encoded with the same information found on the passport (surname, given name, date of birth and sex). It also includes a digital picture of the bearer's face.

The user can use any computer system, for example, information processing systems such as desktop computers, laptop computers, servers, wireless devices (e.g., mobile phones, tablets, personal digital assistants, and the like to send the UPIIWPK in order to create a unique token on system 120.

In some embodiments, the public network 116 and computing platform 120 is part of a cloud computing environment (collectively represented in FIG. 1 by the combination of network 116 and platform 120). Cloud computing will be discussed in more detail with reference to FIG. 5. It should be noted however, that various embodiments of the present invention are applicable to non-cloud computing environments as well. With reference to the example depicted in FIG. 1, a user 102 is shown communicatively coupled to computing platform 120 via a public network 116 such as the Internet.

In one example, a cloud user (via a user systems 102) can use a cloud environment 116, 120 to create a unique token 122 using a zero-knowledge verifiable computing platform 120 after receiving the user's personally identifiable information with private key (UPIIWPK). The output is a unique token with proof it was signed but without revealing which user signed it 130.

Exchange-Traded Market Service Trading Outcomes of Events

Figure 2:
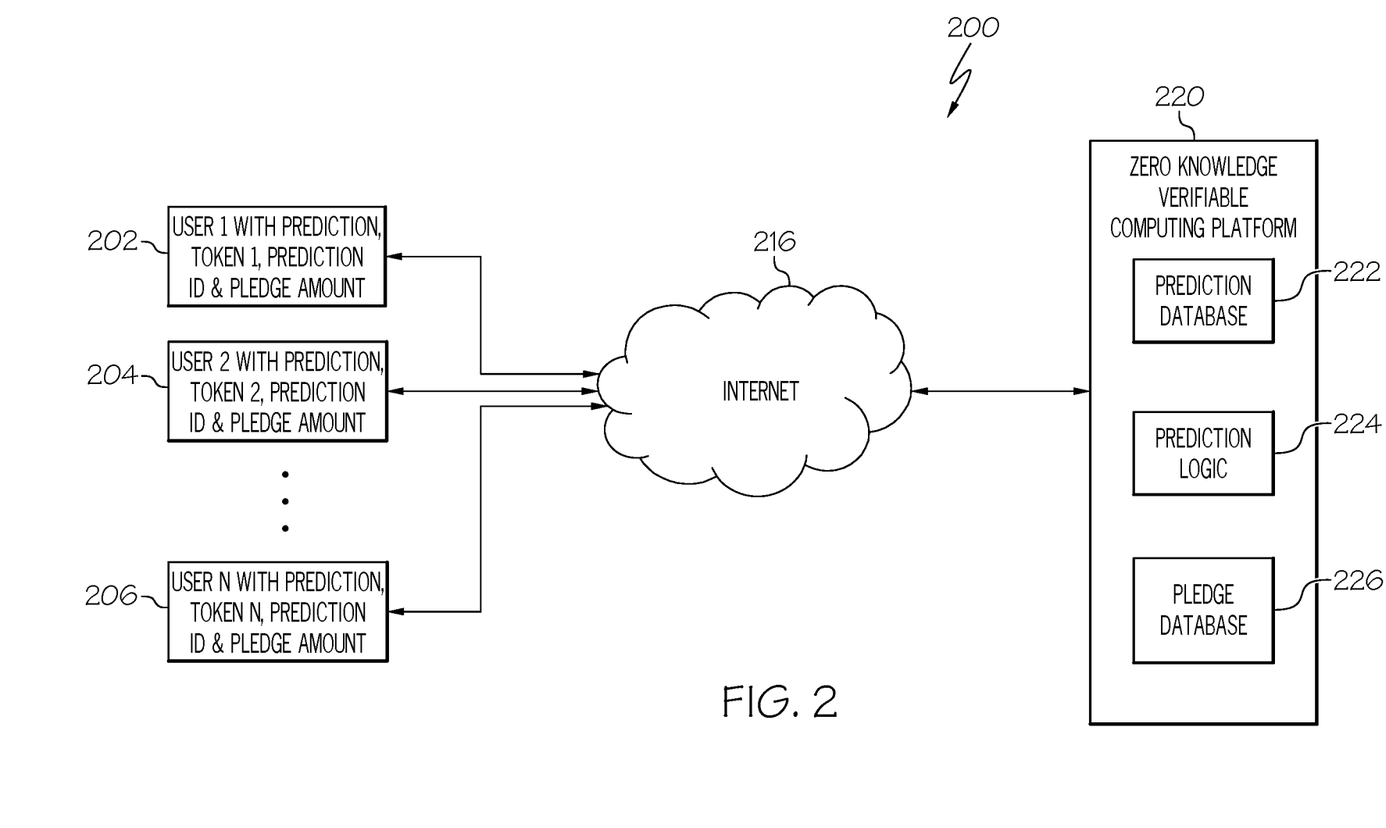
FIG. 2 is a functional diagram illustrating an exchange-traded market service using the token of FIG. 1, in accordance with an embodiment of the present invention.

FIG. 2 is a functional diagram 200 illustrating an exchange-traded market service using the token of FIG. 1. The present invention enables people and organizations to trade outcomes of events.

Again, it should be noted that although the following discussion is directed to a cloud computing environment various embodiments are not limited to such environment and are applicable to non-cloud computing environments as well. In particular, FIG. 2 shows one or more client/user systems 202, 204, 206 communicatively coupled to one or more cloud computing environments 220 running a zero knowledge verifiable computing platform via a public network 216 such as the Internet. The user systems 202, 204, 206 can include, for example, information processing systems such as desktop computers, laptop computers, servers, wireless devices (e.g., mobile phones, tablets, personal digital assistants, etc.), and the like.

The user systems 202, 204, 206 access the cloud computing environment 220 via one or more interfaces (not shown) such as a web browser, application, etc. to utilize resources provided by the zero knowledge verifiable computing platform 220. The platform 220 includes a prediction database 222 which can be searched to find the prediction of a party. As is described in FIG. 3, this database 222 is updated. The platform 220 includes a pledge database 226, and prediction logic 224.

Exchange-Traded Market Service Flow

Figure 3:
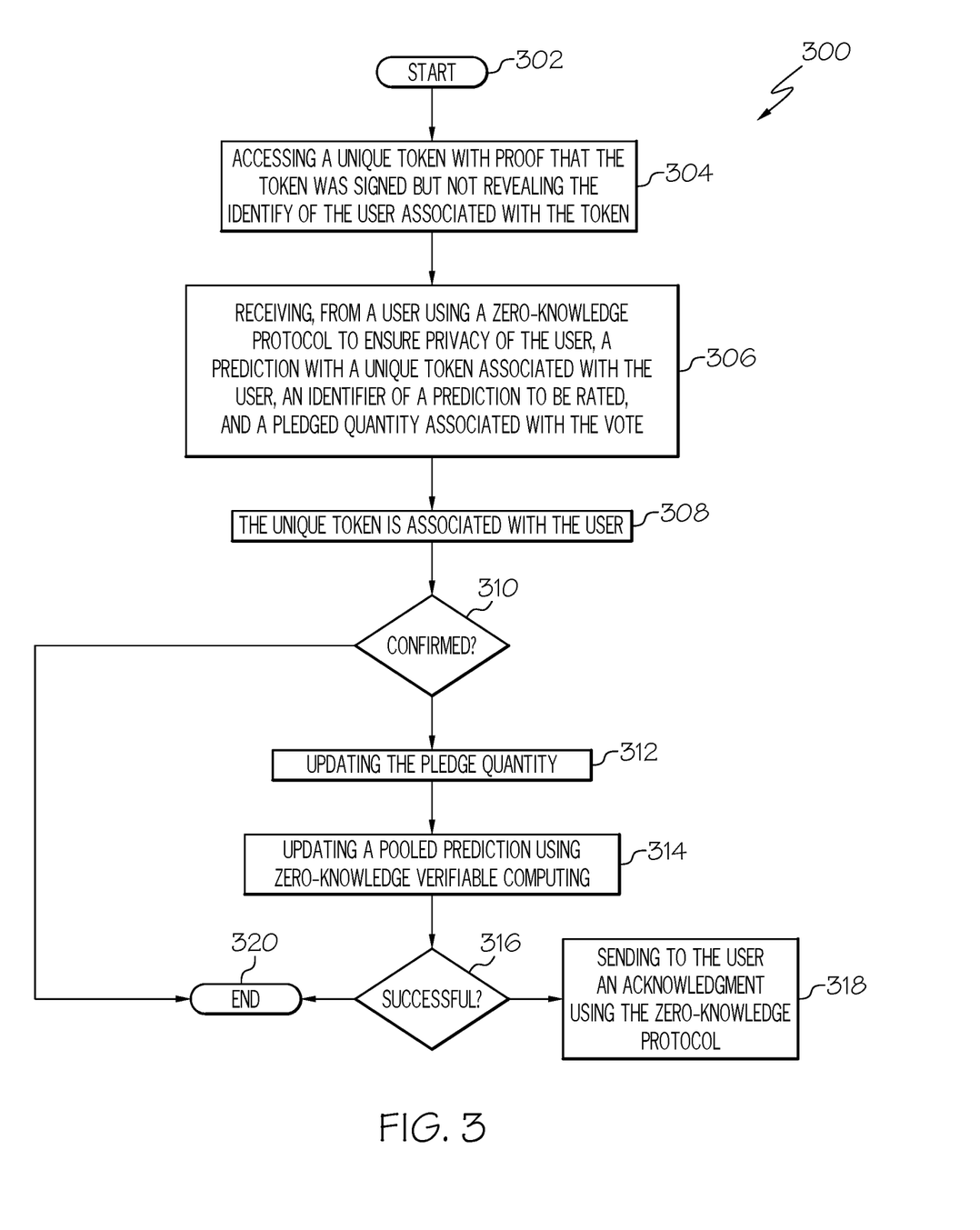
FIG. 3 is a flow diagram illustrating an exchange-traded market service for the purpose of trading outcomes of events, in accordance with an embodiment of the present invention.

FIG. 3 is a flow diagram illustrating an exchange-traded market service for the purpose of trading outcomes of events, in accordance with an embodiment of the present invention. The process starts, for example by user 102 in FIG. 1 initiating a process, in step 302. The process immediately proceeds to step 304.

In step 304, a unique token created from FIG. 1, 130 is accessed. The unique token includes proof that it was signed but not revealing the identity of the user associated with the token. The process then proceeds to step 306.

In step 306, the process continues with receiving from a user, for example user 102 in FIG. 1, using a zero-knowledge protocol to maintain privacy of the user, a prediction with a unique token associated with the user, an identifier of the prediction, and a pledged quantity.

The pledge quantity in one embodiment is a currency or cryptocurrency. In another embodiment, the pledge quantity is a reputation unit of the user and the prediction. The reputation, as previously described above, is a ranking of a person or business entity, such as a company, LLC, PA, etc.

The prediction can be between 0 and 100%. It is important to note that the prediction that supports the outcome of an event is a first numerical rating of the reputation unit of the user, and that opposes the veracity of the statement is a second numerical rating of the reputation unit of the user, and the first numerical rating is different from the second numerical rating. The process then proceeds to step 308.

In step 308, the unique token is reviewed to determine if it is associated with the user for example by the UPIIWPK from FIG. 1. If it is confirmed in step 310 that the unique token is associated with the user, the process continues to step 312. Otherwise the process ends in step 320.

In step 312, (given that the unique token has been confirmed in step 310), the pledge quantity is updated in the user's account. This update is performed using zero-knowledge verifiable computing. The process then proceeds to step 314.

In step 314, a pooled prediction update for the outcome of the event is made using zero-knowledge verifiable computing. For example, if the event is the winner of a sporting event, the total number of predictions supporting one team or the opposing team are tallied. The process continues to step 316.

In step 316, if the result is determined as successful, the process proceeds to step 318.

In step 318, the user receives an acknowledgement using the zero knowledge protocol.

Otherwise, if the result is determined as unsuccessful, the process proceeds to step 320 to end the process.

Extensions and Other Embodiments to the Rating Management Service or Knowledge Service The services which embody the Knowledge Sphere are cloud services, by preferred embodiment advertised as a special class of service (the "Knowledge Service") in the "Hypercloud", as described in U.S. patent application Ser. No. 14/752,230 filed on Jun. 26, 2015 and the "Spheres of Knowledge", as described in U.S. patent application Ser. No. 15/284,985 filed on Oct. 4, 2016, the teaching of each application is hereby incorporated by reference in its entirety. The tracking of specific predictions in the knowledge sphere may themselves be advertised as attributes of the hypercloud service, or as separately advertised services. A separate knowledge sphere index and registry service (the "index") would be used to accumulate and index pointers to many knowledge sphere services and the assertions that they contain and manage.

Participants in the system can connect to a knowledge service instance and, optionally, submit one or more Propositions to the system by predicting an outcome of an event and staking a pledge quantity on it. The service would query a reputon sphere service instance to verify that the user has that number of positive reputons at the time of the transactions, and if so, records the assertion and the number of reputons staked on it; it is then tracked and advertised from that service instance. Other participants may then stake additional reputons on that statement, or may attempt to negate the Assertion by accumulation of "bogons", by staking reputons to declare that a statement is bogus.

State in the system may be stored in the form of transactions recorded on a blockchain, or entries in the distributed registry, more complex records in a shared cloud storage or database service.

Embodiment: As with reputons and with the services described above operate, these services operate in Zero Knowledge and use Cryptographic Verifiability such as PCP, zkSNARK, SCIP, or similar methods in order to maintain their ability to act as a trusted (because mathematically verifiable) service used by mutually untrusting and often anonymous parties. In a preferred embodiment, operations is transparent and source code is shared in order to maintain trust.

Floating price of bogons: The price of bogons (i.e., 1 bogon for 1 staked reputon, 0.5 bogons per reputon, etc.) will vary based on a dynamic algorithm that attempts to maintain a fair balance between those making Propositions and those trying to invalidate them. In a preferred embodiment, this algorithm would start as a simple formula, such as one bogon per reputon, and then be updated over time, either as a simple ratio or as a more complex algorithm taking in other information in the knowledge sphere itself or similar mechanism.

Floating lifetime and time window of bogons: like the price of bogons, the preset Lifetime of a bogon could optionally vary based on the consensus-based version control. When a proposition is invalidated, the bogon's term ends early and reward reputons may be awarded to the bogon creator. However, if the lifetime expires on a bogon without the proposition or statement being successfully invalidated, it's staked reputons are lost. The algorithm may define lifetimes in terms of a floating window in which bogons are continuously created and lost, or using fixed time windows in which all bogons are created and if they fail, lost at the same time.

Floating ratio of reward reputons: Optionally, reputons may be rewarded to those who successfully invalidate a proposition. This reward of reputons and the quantity in which they are rewarded is also subject to control by a floating algorithm to be maintained by the community using consensus-based version control.

Composite reputon-knowledge space: Optionally, the algorithms described above which determine the price and lifetime of bogons and the existence and ratio of reward reputons may also take into account reputation within a particular contest, such as a membership to a group.

Composite reputons are further described in co-pending U.S. Patent Ser. No. 15/258,297, entitled "Zero Knowledge Reputation Service", filed on Sep. 7, 2016, now U.S. Pat. No. 10,243,964, the teachings of which are hereby incorporated by reference in its entirety. As described, some or all variables in the algorithm vary according to context. Context in the composite-knowledge space allows for rules of the algorithm to vary, for example between the context of the academic vs. the political contexts, or between two competing ideological contexts. This allows propositions to stand in one context alone, or across contexts with the algorithm determining the interaction between the contexts.

Competing propositions: Optionally, two or more propositions may be defined as mutually exclusive with one context or between contexts. The details of this interaction will be the subject of a separate disclosure.

Monetization: Knowledge sphere services and the index service may optionally be monetized through cryptocurrency or other currency micropayments per use, or subscription-based access fees.

Services and statements tracked by them may also be migrated to or replicated on other nodes in the Cloud or other Service instances for redundancy, efficiency, and robustness.

Generalized Computing Environment

Figure 4:
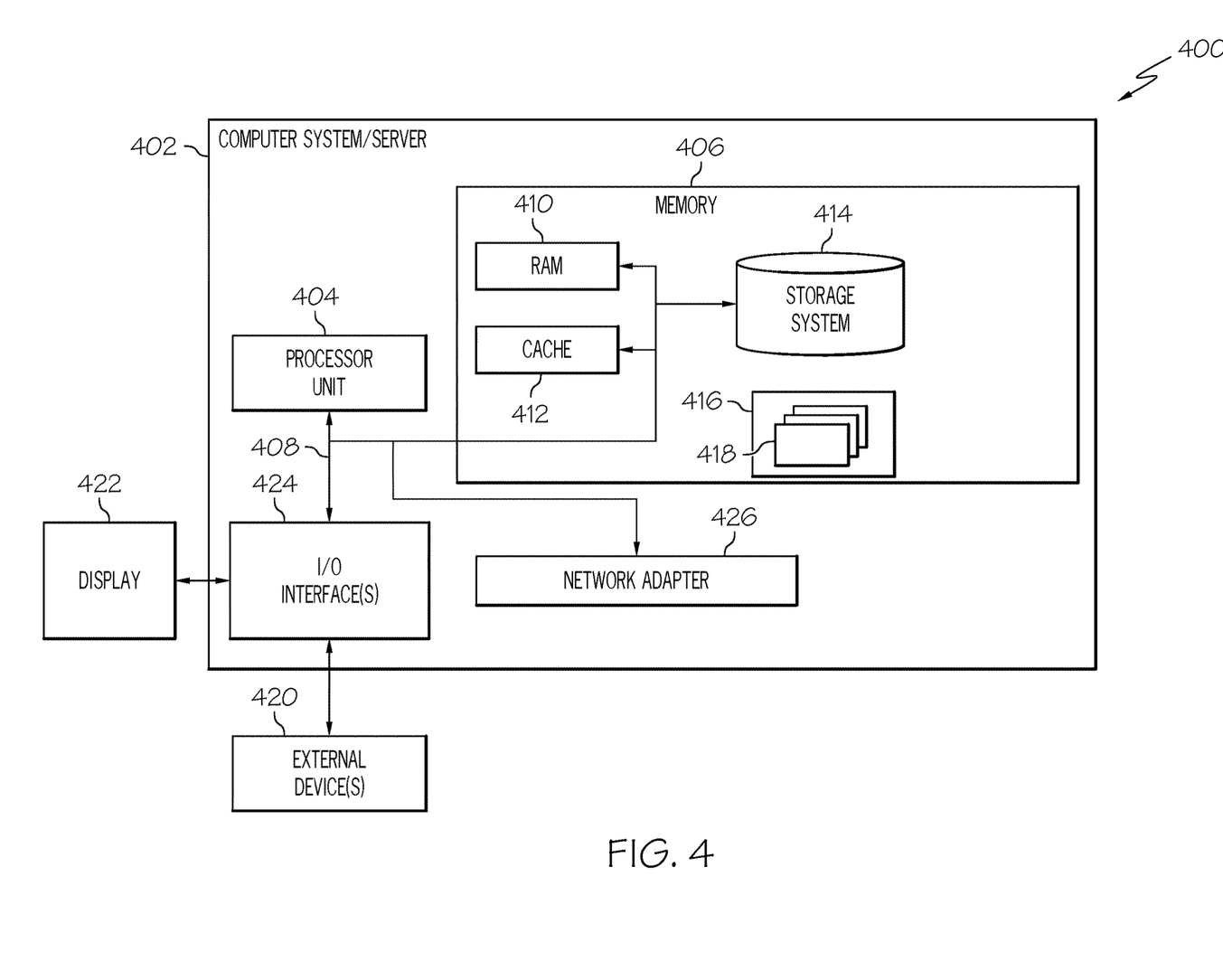
FIG. 4 illustrates one example of a cloud computing node, in accordance with an embodiment of the present invention.

FIG. 4 illustrates one example of a processing node 400 for operating the zero-knowledge verifiable computing platform 120, in accordance with an embodiment of the present invention. This example is not intended to suggest any limitation as to the scope of use or functionality of embodiments of the invention described herein and the processing node 400 is capable of being implemented and/or performing any one or more of the functionalities set forth herein.

As depicted, processing node 400 can be a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules as further described below, being executed by a computer system. Generally, program modules may include routines, programs, objects, components, logic, data structures, and so on that perform particular tasks or implement particular abstract data types. Computer system/server 402 may be practiced as one node of a distributed cloud computing environment, an example of which will be described with reference to FIG. 5. In such cloud computing environments, tasks are performed by remote processing devices that are linked through a communications network. In a distributed cloud computing environment, program modules 418 may be stored in one or more local and remote computer system storage media, including memory storage devices.

As shown in FIG. 4, computer system/server 402 in cloud computing node 400 is shown in the form of a general-purpose computing device. The components of computer system/server 402 may include, but are not limited to, one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406, in one embodiment, implements the functions of FIG. 2 and the processes described with reference to FIG. 3. The system memory 406 can include computer readable media in the form of volatile memory, such as random access memory (RAM) 410 and/or cache memory 412. Computer system/server 402 may further include other removable/non-removable, volatile/non-volatile computer system storage media. By way of example only, storage system 414 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one computer program product having a set (e.g., at least one) of program modules 418 stored that are configured to carry out functions of various embodiments of the invention.

Program/utility 416, having a set (at least one) of program modules 418, may be stored in memory 406 by way of example, and not limitation, as well as an operating system, one or more application programs, other program modules, and program data. Each of the operating system, one or more application programs, other program modules, and program data or some combination thereof, may be adapted to a networking environment. In some embodiments, program modules 418 carry out the functions and/or methodologies of various embodiments of the invention described herein.

With reference again to FIG. 4, computer system/server 402 may also communicate with one or more external devices 420 such as a keyboard, a pointing device, a display 422, etc. Such external devices 420 include one or more devices that enable a user to interact with computer system/server 402; and/or any devices (e.g., network card, modem, etc.) that enable computer system/server 402 to communicate with one or more other computing devices. Such communication/interaction can occur via I/O interfaces 424. In some embodiments, computer system/server 402 can communicate with one or more networks such as a local area network (LAN), a general wide area network (WAN), and/or a public network (e.g., the Internet) via network adapter 426. As depicted, network adapter 426 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

Computer Program Product Support

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 5:
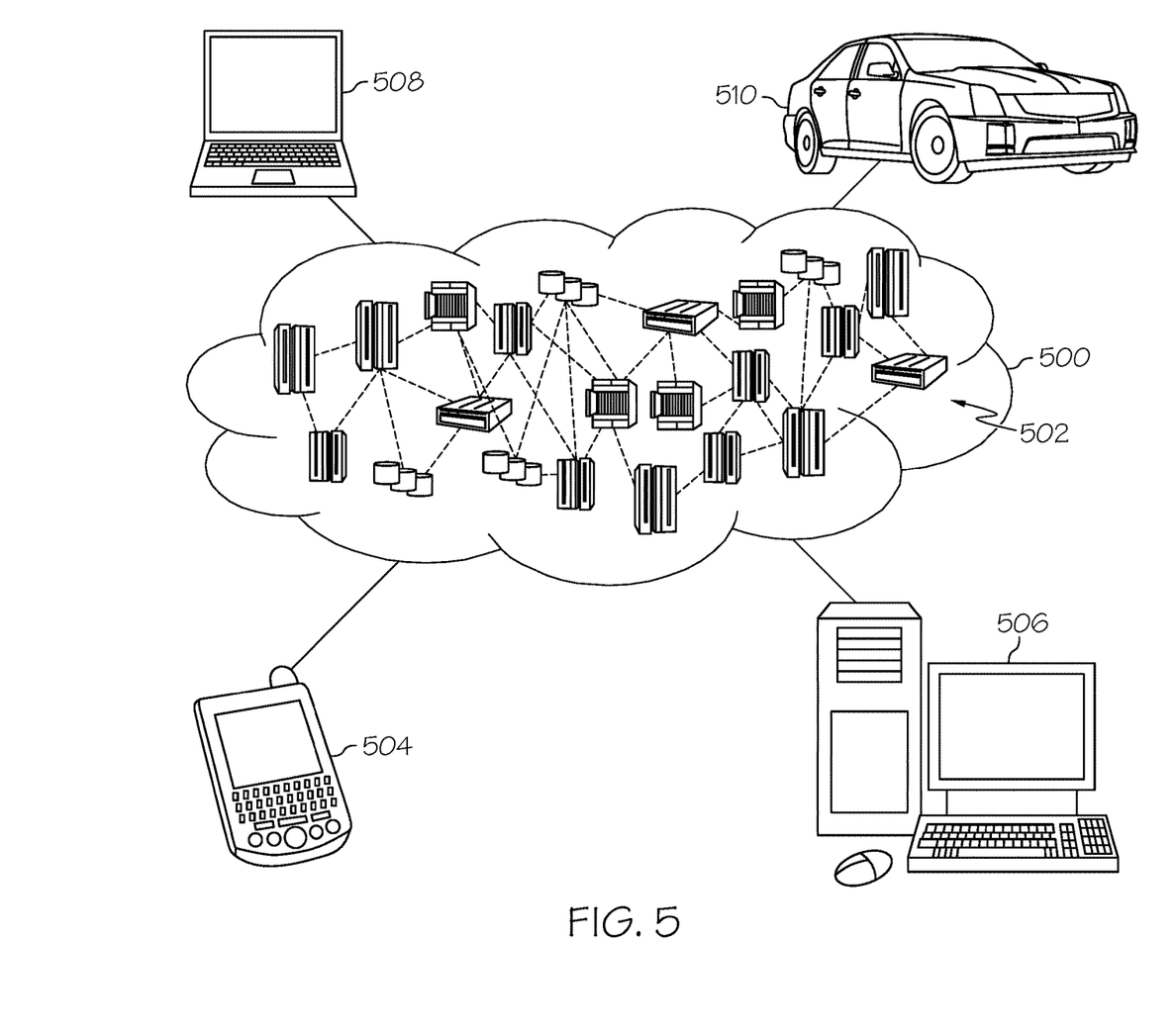
FIG. 5 illustrates one example of a cloud computing environment, in accordance with an embodiment of the present invention.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504, desktop computer 506, laptop computer 508, and/or automobile computer system 510 may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504, 506, 508, 510 shown in FIG. 5 are intended to be illustrative only and that computing nodes 502 and cloud computing environment 500 can communicate with any type of computerized device over any type of network and/or network addressable connection (e.g., using a web browser).

Figure 6:
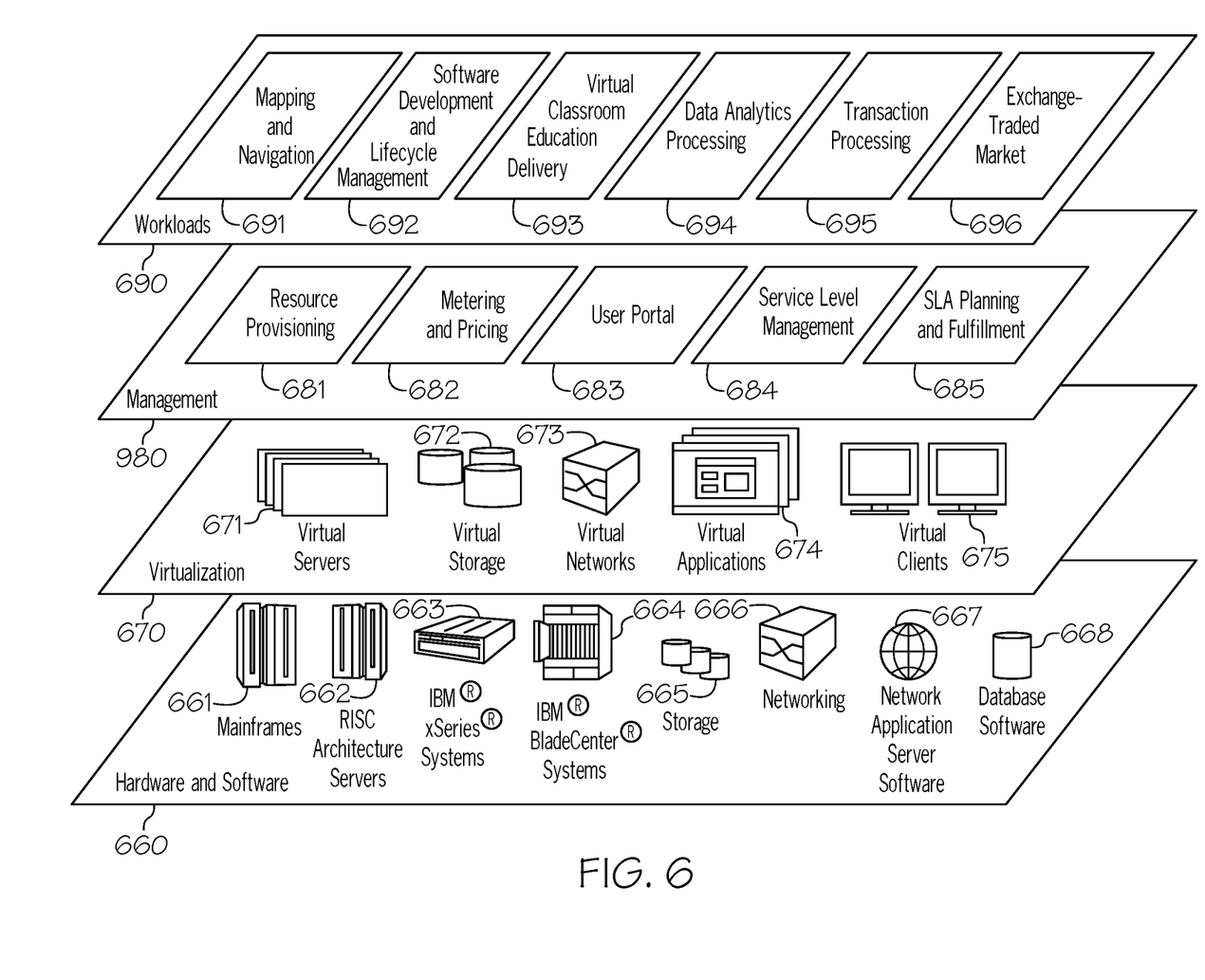
FIG. 6 illustrates abstraction model layers, in accordance with an embodiment of the present invention.

Referring now to FIG. 6, an exemplary set of functional abstraction layers provided by cloud computing environment 500 is shown. It is understood that the components, layers, and functions shown in FIG. 6 are illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and an exchange-traded market service for trading outcomes of events 696 in accordance with an embodiment of the present invention.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for trading outcomes of events, comprising:
receiving, at a zero-knowledge verifiable computing platform from a user, a user's personally identifiably information signed with a private key registered with a trusted certificate authority;

generating, at the zero-knowledge verifiable computing platform, a unique token associated with the user with a first probabilistically checkable proof (PCP), in which a signature can be validated without revealing the user associated with the unique token;

sending, from the zero-knowledge verifiable computing platform, the unique token that has been generated with the first PCP to the user;

receiving, at the zero-knowledge verifiable computing platform, from the user using a zero-knowledge protocol to maintain privacy of the user, each of
    the unique token associated with the user,
    a prediction for an outcome of an event, which is a probability as a number between zero and one hundred percent that supports or opposes that a given event will happen within a stated time period,
    a pledged quantity associated with the prediction, wherein the pledge quantity is a reputation unit which is a ranking of a person or business entity;

confirming, at the zero-knowledge verifiable computing platform, the unique token is signed by the trusted certificate authority and is associated with the user;

in response to confirming the unique token is associated with the user, updating, at the zero-knowledge verifiable computing platform, the pledge quantity tied to the prediction for the user using zero-knowledge verifiable computing with a second probabilistically checkable proof (PCP);

in response to the updating the pledge quantity tied to the prediction for the user, updating a pooled prediction for the outcome using zero-knowledge verifiable computing;

in response to the updating of the pool prediction for the outcome being successful, sending, by the zero-knowledge verifiable computing platform to the user, an acknowledgment using the zero-knowledge protocol with the second PCP attached.

2. The computer-implemented method of claim 1, further comprising:
    at least one of dynamically constructing and altering one or more multi-node transient processing pathways between a user device and a computer related device based on receiving the unique token, the prediction, and the pledged quantity from the user, and
    wherein for at least one node in each of the one or more transient processing pathways, an address thereof and a time period the at least one node is active and capable of being used is set or changed, based on at least one of an application programming interface type and a data request type implicated by a received packet, and each of the one or more multi-node transient processing pathways comprise a plurality of virtual machines with a variable topology;
    in response to the updating of the pool prediction being successful, sending to the user an acknowledgment using the zero-knowledge protocol.

3. The computer-implemented method of claim 1, wherein the unique token is selected from the group consisting of a tax identifier, an e-passport, and a private key of a DNS Domain registered with a certificate authority.

4. The method of claim 1, wherein the prediction is a binary option.

5. The method of claim 4, comprising multiple predictions, wherein a first prediction is in support of the outcome of the event and is a first numerical reputation rating of the user, and
    a second prediction is in opposition to the outcome of the event and is a second numerical reputation rating of the user,
    wherein, the first numerical reputation rating is different from the second numerical reputation rating.

6. The method of claim 1, further comprising:
    receiving, from a user using a zero-knowledge protocol to ensure privacy of the user, a rating with a unique token associated with the user; and
    in response to the prediction being true, updating the rating of the user proportional to an aggregate sum total of a pledge quantity from other users.

7. The method of claim 1, further comprising:
    receiving, from a user using a zero-knowledge protocol to ensure privacy of the user, a cryptocurrency associated with the user; and
    in response to the prediction being true, updating an amount of the cryptocurrency of the user proportional to an aggregate sum total of a pledge quantity of cryptocurrency from other users.

8. The method of claim 1, further comprising:
    receiving a cryptocurrency from another user for access to the prediction of the outcome.

9. The method of claim 1, wherein the zero-knowledge verifiable computing is selected from the group consisting of a succinct computational integrity and privacy (SCIP) technique, a succinct non-interactive argument of knowledge (zk-snark) technique, and a probabilistically checkable proof (PCP) technique.

10. The method of claim 1, further comprising:
    storing as a transaction in a blockchain the pooled prediction that has been updated as a separate block in the blockchain.

11. A system for trading outcomes of events, the system comprising:
    a memory;
    a processor communicatively coupled to the memory, where the processor is configured to perform
        receiving, at a zero-knowledge verifiable computing platform from a user, a user's personally identifiably information signed with a private key registered with a trusted certificate authority;
        generating, at the zero-knowledge verifiable computing platform, a unique token associated with the user with a first probabilistically checkable proof (PCP), in which a signature can be validated without revealing the user associated with the unique token;
        sending, from the zero-knowledge verifiable computing platform, the unique token that has been generated with the first PCP to the user;
        receiving, at the zero-knowledge verifiable computing platform, from the user using a zero-knowledge protocol to maintain privacy of the user, each of
            the unique token associated with the user,
            a prediction for an outcome of an event, which is a probability as a number between zero and one hundred percent that supports or opposes that a given event will happen within a stated time period,
            a pledged quantity associated with the prediction, wherein the pledge quantity is a reputation unit which is a ranking of a person or business entity;

confirming, at the zero-knowledge verifiable computing platform, the unique token is signed by the trusted certificate authority and is associated with the user;

in response to confirming the unique token is associated with the user, updating, at the zero-knowledge verifiable computing platform, the pledge quantity tied to the prediction for the user using zero-knowledge verifiable computing with a second probabilistically checkable proof (PCP);

in response to the updating the pledge quantity tied to the prediction for the user, updating a pooled prediction for the outcome using zero-knowledge verifiable computing;

in response to the updating of the pool prediction for the outcome being successful, sending, by the zero-knowledge verifiable computing platform to the user, an acknowledgment using the zero-knowledge protocol with the second PCP attached.

12. The system of claim 11, further comprising:

at least one of dynamically constructing and altering one or more multi-node transient processing pathways between a user device and a computer related device based on receiving the unique token, the prediction, and the pledged quantity from the user, and wherein for at least one node in each of the one or more transient processing pathways, an address thereof and a time period the at least one node is active and capable of being used is set or changed, based on at least one of an application programming interface type and a data request type implicated by a received packet, and each of the one or more multi-node transient processing pathways comprise a plurality of virtual machines with a variable topology;

in response to the updating of the pool prediction being successful, sending to the user an acknowledgment using the zero-knowledge protocol.

13. The system of claim 11, wherein the unique token is selected from the group consisting of a tax identifier, an e-passport, and a private key of a DNS Domain registered with a certificate authority.

14. The system of claim 11, wherein the prediction is a binary option.

15. The system of claim 14, comprising multiple predictions, wherein a first prediction is in support of the outcome of the event and is a first numerical reputation rating of the user, and a second prediction is in opposition to the outcome of the event and is a second numerical reputation rating of the user, wherein, the first numerical reputation rating is different from the second numerical reputation rating.

16. The system of claim 11, further comprising:

receiving, from a user using a zero-knowledge protocol to ensure privacy of the user, a rating with a unique token associated with the user; and in response to the prediction being true, updating the rating of the user proportional to an aggregate sum total of a pledge quantity from other users.

17. The system of claim 11, further comprising:

receiving, from a user using a zero-knowledge protocol to ensure privacy of the user, a cryptocurrency associated with the user; and in response to the prediction being true, updating an amount of the cryptocurrency of the user proportional to an aggregate sum total of a pledge quantity of cryptocurrency from other users.

18. The system of claim 11, further comprising:

receiving a cryptocurrency from another user for access to the prediction of the outcome.

19. A non-transitory computer program product for trading outcomes of events comprising a computer readable storage medium having computer readable program code embodied therewith, the computer readable program code configured to perform:

receiving, at a zero-knowledge verifiable computing platform from a user, a user's personally identifiably information signed with a private key registered with a trusted certificate authority;

generating, at the zero-knowledge verifiable computing platform, a unique token associated with the user with a first probabilistically checkable proof (PCP), in which a signature can be validated without revealing the user associated with the unique token;

sending, from the zero-knowledge verifiable computing platform, the unique token that has been generated with the first PCP to the user;

receiving, at the zero-knowledge verifiable computing platform, from the user using a zero-knowledge protocol to maintain privacy of the user, each of the unique token associated with the user, a prediction for an outcome of an event, which is a probability as a number between zero and one hundred percent that supports or opposes that a given event will happen within a stated time period, a pledged quantity associated with the prediction, wherein the pledge quantity is a reputation unit which is a ranking of a person or business entity;

confirming, at the zero-knowledge verifiable computing platform, the unique token is signed by the trusted certificate authority and is associated with the user;

in response to confirming the unique token is associated with the user, updating, at the zero-knowledge verifiable computing platform, the pledge quantity tied to the prediction for the user using zero-knowledge verifiable computing with a second probabilistically checkable proof (PCP);

in response to the updating the pledge quantity tied to the prediction for the user, updating a pooled prediction for the outcome using zero-knowledge verifiable computing;

in response to the updating of the pool prediction for the outcome being successful, sending, by the zero-knowledge verifiable computing platform to the user, an acknowledgment using the zero-knowledge protocol with the second PCP attached.

20. The computer program product of claim 19, wherein the unique token is one or more of a tax identifier, an e-passport, or a private key of a DNS Domain registered with a certificate authority.

* * * * *